No. 719,202. PATENTED JAN. 27, 1903.
J. DENNIS.
PRESS.
APPLICATION FILED JULY 16, 1902.
NO MODEL. 2 SHEETS—SHEET 1.
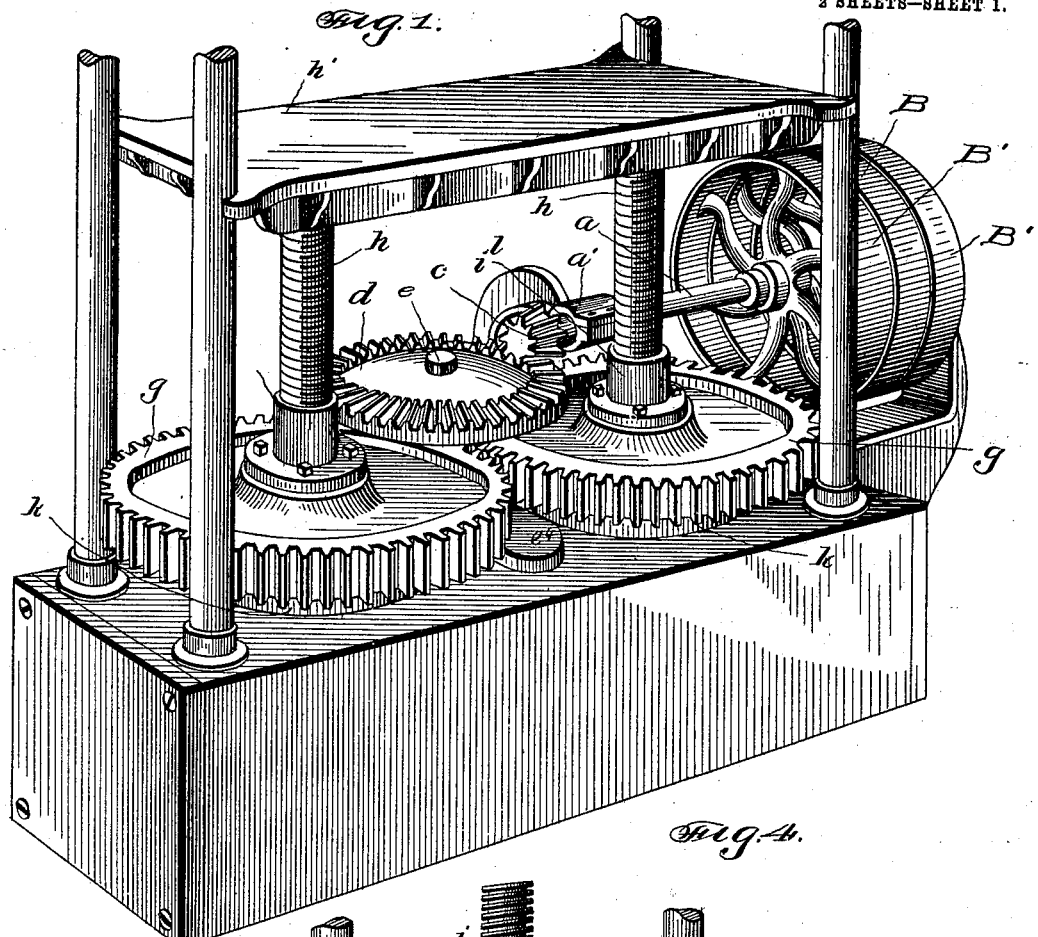
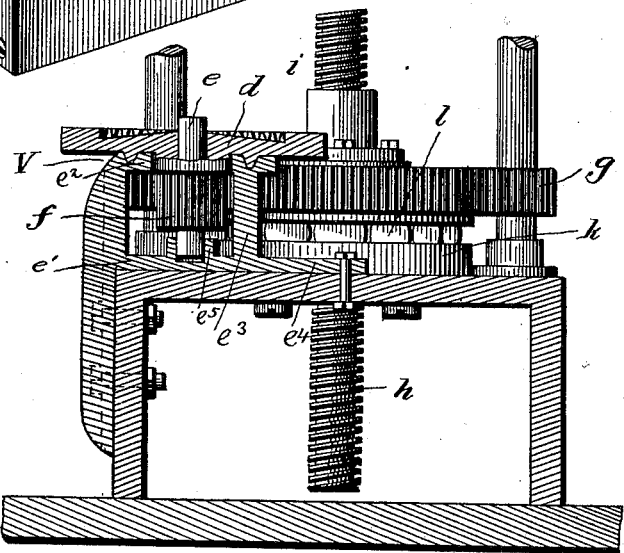
Witnesses
R. A. Boswell.
R. H. Bishop.
Inventor,
John Dennis,
By Davis & Davis
Attorneys.
THE NORRIS PETERS CO., PHOTO-LITHO., WASHINGTON, D. C.

No. 719,202. PATENTED JAN. 27, 1903.
J. DENNIS.
PRESS.
APPLICATION FILED JULY 16, 1902.
NO MODEL. 2 SHEETS—SHEET 2.
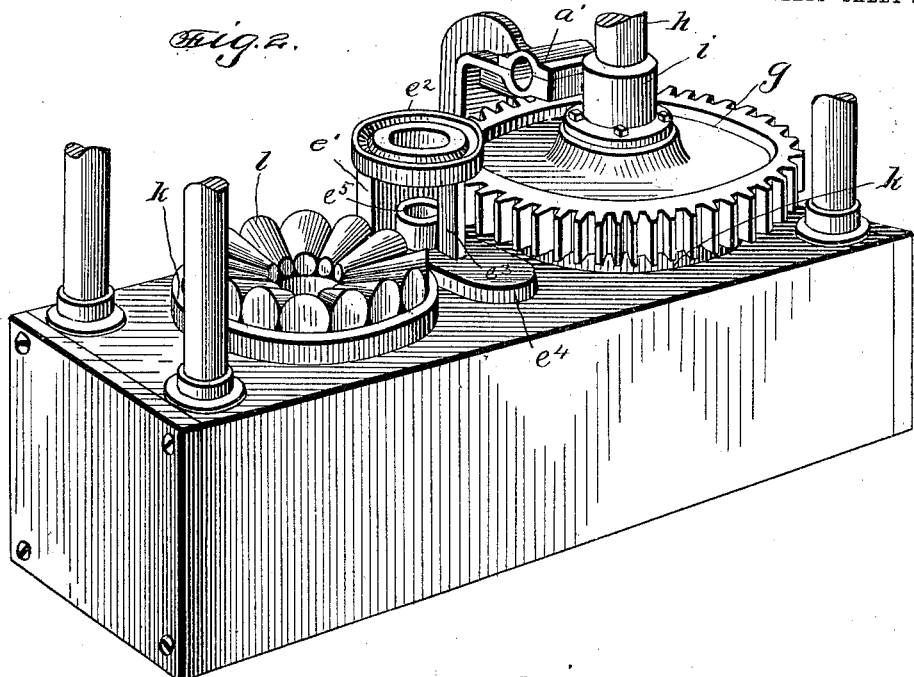
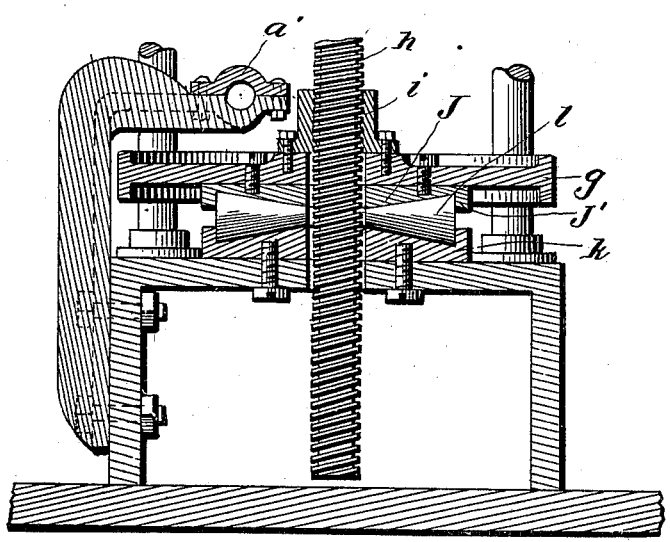
Witnesses
R. A. Boswell
R. H. Bishop
Inventor
John Dennis,
By Davis & Davis,
Attorneys.

UNITED STATES PATENT OFFICE.

JOHN DENNIS, OF LOWELL, MASSACHUSETTS.

PRESS.

SPECIFICATION forming part of Letters Patent No. 719,202, dated January 27, 1903.

Application filed July 16, 1902. Serial No. 115,867. (No model.)

*To all whom it may concern:*

Be it known that I, JOHN DENNIS, a citizen of the United States of America, residing at Lowell, in the county of Middlesex and Commonwealth of Massachusetts, have invented certain new and useful Improvements in Presses, of which the following is a full, clear, and exact description.

Figure 1 is a perspective view of the lower part of a cloth-press provided with my improvements. Fig. 2 is a similar view with some of the parts removed for the purposes of better illustration. Fig. 3 is a vertical cross-section taken through one of the spur-gears and its bearing, and Fig. 4 is a vertical transverse section taken through the bevel-gear $d$ and its supporting-bracket.

This invention has special relation to that class of presses adapted for pressing cloth goods of all kinds, including shawls, hosiery, and knit goods, but may be employed for baling all kinds of goods or materials which are to be pressed very compactly; and the object of the invention is to provide simple, durable, and compact mechanism for applying power to the movable platen, as more fully hereinafter set forth.

Referring to the drawings by reference-letters, $a$ designates the power-shaft, journaled in bearings in suitable brackets $a'$, attached to the base, and provided at its outer end with a tight pulley B. A loose pulley B' is mounted on the power-shaft on either side of the tight pulley for the purpose of carrying a straight belt and a crossed belt, whereby the motion may be readily reversed, or the motion may be reversed from a counter-shaft overhead.

On the inner end of shaft $a$ is a bevel-pinion $c$, which meshes with a large horizontal bevel-gear $d$, made tight on a vertical shaft $e$, which is journaled in a suitable stand or bracket $e'$, attached to the base and carrying a spur-pinion $f$, which is preferably made solid with the shaft and is in mesh with two large horizontal spur-gears $g$. These spur-gears receive the pressure through the two vertical screws $h$, which are rigidly attached at their upper ends to the movable platen $h'$ and have their lower ends working through nuts $i$, bolted to the upper sides of the respective spur-gears and freely through central openings in the spur gears and openings in the base. The threads of the screws are identical in pitch and direction, and they may either be both left hand or both right hand, as may be desired.

Secured to the under side of each spur-gear is a steel disk J, having a depending circular flange J' at its edge and a conical bearing-surface, and fastened to the base is a similar disk $k$. Both disks are provided with central openings for the free passage of the screw, and between the disks is arranged a circular series of antifriction-rollers $l$, which taper inward to correspond with the conical bearing-surfaces of the bearing-disks.

On the bottom of the bevel-gear $d$ is a circular V or way similar in cross-section to the V on a planer-way, which works in a corresponding channel in the top surface of the bracket $e'$. When oil is introduced into this channel, it reduces the friction of the thrust of the gear to a minimum and takes the wear off the end of the upright pinion-shaft.

The bracket $e'$ consists of a ring $e^2$, attached to the upper end of the main part of the bracket and supported at its inner part by a post $e^3$, integrally connecting it to a plate $e^4$, resting and secured upon the base of the press. Concentrically below the ring and formed integral with plate $e^4$ is a step-bearing $e^5$, which receives the lower end of the pinion-shaft $e$. The hub of the bevel-gear fits within ring $e^2$, so that the pinion-shaft and bevel-gear have bearings at three points—namely, at the lower end of the pinion-shaft, at the hub of the bevel-gear, and at the circular way—so that they will be firmly supported.

It will be observed that by arranging the spur-pinion between and in mesh with the two spur-gears the latter will be rotated in the same direction and at the same speed and that the screws (being attached non-rotatively to the platen) will be moved in unison, ascending or descending, according to which direction the spur-gears are rotated. It will be observed also that in my apparatus the thrust is taken up by the two sets of comparatively large antifriction-rollers arranged directly under the main gears, thereby reducing wear and friction to a minimum, and that the conical shape of the rolls and their bearing-surfaces tends to properly center the gears and screws.

Heretofore the usual manner of applying pressure in this class of machines has been to use either double right and left worms and worm-gears, together with right and left screws, or else a single worm working between two worm-gears. The advantage of my apparatus over these devices is that by doing away with the worm devices I save a great deal of friction, and thereby not only obtain a greater pressure from a given power, but also reduce wear to a minimum.

It is obvious that I am not restricted to the details of construction shown and described, as various changes may be made without departing from the invention. For instance, the antifriction-rollers under the spur-gears may be omitted and any other suitable bearing may be employed.

Having thus described my invention, what I claim, and desire to secure by Letters Patent, is—

In a press, a base, a movable platen and screws depending therefrom, spur-gears carrying nuts and rotatably supported on the base, a bracket supported on the base between said gears and consisting of a ring $e^2$ having an annular groove in its upper surface, and a step-bearing concentrically below said ring, a pinion-shaft having its lower end stepped in said step-bearing and carrying a pinion meshing with said spur-gears, a bevel-gear attached to the upper end of said pinion-shaft and having a circular flange or way fitting in the channel in the ring and a hub fitting within the ring, and means for driving said bevel-gear.

In testimony whereof I hereunto affix my signature, in the presence of two witnesses, this 28th day of June, 1902.

JOHN DENNIS.

Witnesses:
    JOHN J. HARVEY,
    LEOPOLD M. REINHARDT.